United States Patent
Lopes

(10) Patent No.: US 6,945,081 B1
(45) Date of Patent: Sep. 20, 2005

(54) RETRACTABLE SECURITY CABLE DEVICE

(76) Inventor: Michael A. Lopes, P.O. Box 145, Madison, CA (US) 95653

( * ) Notice: Subject to any disclaimer, the term of this patent is extended or adjusted under 35 U.S.C. 154(b) by 156 days.

(21) Appl. No.: 10/689,891

(22) Filed: Oct. 20, 2003

(51) Int. Cl.$^7$ ............................ E05B 71/00; B62H 5/00
(52) U.S. Cl. .......................................... 70/233; 280/274
(58) Field of Search ........................... 70/233–236, 30, 70/49; 280/233, 274, 281.1, 284.4

(56) References Cited

U.S. PATENT DOCUMENTS

| | | | |
|---|---|---|---|
| 3,910,602 A | * | 10/1975 | Lindner ....................... 244/427 |
| 4,023,387 A | * | 5/1977 | Gould ............................ 70/233 |
| 4,024,741 A | * | 5/1977 | Arblaster ...................... 70/233 |
| 4,064,714 A | * | 12/1977 | Treslo ............................ 70/18 |
| 4,708,004 A | * | 11/1987 | Allen ............................ 70/226 |
| 5,018,374 A | | 5/1991 | Montano |
| 5,063,762 A | | 11/1991 | Vandeweghe |
| 5,065,603 A | | 11/1991 | Kloke |
| 5,226,341 A | * | 7/1993 | Shores ........................ 74/551.8 |
| 5,251,464 A | | 10/1993 | Halter |
| 5,408,212 A | | 4/1995 | Meyers et al. |
| 5,513,508 A | * | 5/1996 | Saunders et al. .............. 70/233 |
| 5,678,435 A | | 10/1997 | Hodson |
| 5,785,289 A | * | 7/1998 | Shieh ....................... 248/230.1 |
| 5,889,463 A | * | 3/1999 | Judd et al. ................... 340/427 |
| D451,368 S | | 12/2001 | Hardesty |
| 6,373,382 B2 | * | 4/2002 | Tikkanen et al. ............ 340/432 |
| 6,505,846 B1 | * | 1/2003 | Hoffman ..................... 280/274 |
| 6,751,992 B1 | * | 6/2004 | Esquilin ...................... 70/233 |

OTHER PUBLICATIONS

Whiplock, bicycle bike lock, May 13, 2002, 1 page total, USA.
Performance Bicycle, U-lock, May 13, 2002, 1 page total, USA.

* cited by examiner

Primary Examiner—John B. Walsh
(74) Attorney, Agent, or Firm—Dennis A. DeBoo

(57) ABSTRACT

Bicycle retractable security cable device comprising a cable disposed within a first frame member and within an opened ended housing extending along a second frame member, the cable comprising an external cable portion extending from the first frame member and terminating to a first looped end and an internal cable portion removably coupled to a spring disposed in and removably coupled to the housing for providing an external cable portion having a length grater than the spring length when the cable is in a stowed position such that the spring can be decoupled from and pulled through an open end of the housing a length greater than the spring length for spring repair or replacement. A coupling means couples the first looped cable end to the bicycle such that the cable loops up and forms a cable loop complemental in shape to other bicycle cables.

7 Claims, 7 Drawing Sheets

RETRACTABLE SECURITY CABLE DEVICE

FIELD OF THE INVENTION

This instant invention relates generally to retractable security cable instrumentalities and, in particular, to a retractable security cable device particularly for use with bicycles.

BACKGROUND OF THE INVENTION

Due to changes in economics, air quality, long-term pollution effects on the environment and the public's awareness of a need to conserve energy and protect the environment, the number of individuals that use bicycles as their principal mode of transportation has increased in recent years. Because of the nature of the weight and size of bicycles, this vehicle is prone to theft. For example, even if a bicycle is secured such that the wheel will not rotate, it is generally light weight enough that it can be carried away, rendering the removal of the security device at a remote site relatively easy to the thief. Thus, the need for an efficient, effective means to secure a bicycle while it is not in use has led to the development of many different types of bicycle security systems or devices.

For example, the patent to Kloke (U.S. Pat. No. 5,065,603, issued Nov. 19, 1991) teaches a tubular lock and method for mounting same. Kloke teaches a cable captured within a tubular housing externally adhered, via double sided tape, to the exterior of the frame of the bicycle, wherein the cable is manually pulled out and pushed back into the housing. The adhered tubular housing can be easily removed from the bicycle.

The patent to Hoffman (U.S. Pat. No. 6,505,846 issued Jan. 14, 2003) teaches a bicycle cable locking system. A double length cable is stowed in a frame tube of a bicycle and automatically surrounds the head of the bicycle frame. The spring, however, which provides the cable with its retraction means is not replaceable. That is, once the spring or cable snaps or breaks, there is no way to repair or replace them, thereby rendering the locking system inoperable. Hoffman further teaches retrofits which share the problem of having no way to repair or replace a broken spring and further suffers from the problem of being easily removed from the bicycle.

For the foregoing reasons, there is a need for a device which provides an effective and efficient means by which to secure a bicycle while it is not in use such that the bicycle is not merely carried away (even if its rotation means, i.e., wheels, are hindered).

In addition, a need exists for a security device for bicycles wherein the cables or parts which comprise the bicycle locking system or device cannot merely be mutilated on site, such that the security device is easily removed and the bicycle stolen.

Moreover, a need exists for a locking system or security device for a bicycle which is not rendered permanently inoperable upon component breakage and/or failure.

None of the known prior art overcomes the above deficiencies.

BRIEF SUMMARY OF THE INVENTION

This invention is distinguished over the known prior art in a multiplicity of ways. For one thing, an embodiment of the invention provides a repairable retractable security cable device or system which solves the problem of becoming rendered permanently inoperable upon component breakage and/or failure. Additionally, an embodiment of the invention provides a retractable security cable device or system that is durable in construction while being inexpensive to manufacture. Furthermore, an embodiment of the invention provides a retractable security cable device or system which solves the problem of easy mutilation of a security cable by providing a very strong, flexible cable, such as an aviation or aircraft grade steel cable. Moreover, the instant invention provides a retractable security cable device that solves the structural flaws inherent in the existing bicycle locking devices. Hence, an embodiment of the invention provides an effective, efficient, cost effective retractable security cable device by which to secure a bicycle.

In one embodiment of the invention, the retractable security cable device is comprised of a hollow elongated spring housing rigidly coupled to a rear portion of a first frame member of a bicycle such that the hollow elongated spring housing includes a first open end circumscribing an opening disposed at the rear portion of the first frame member and further includes a portion extending away from the first open end and extending tangentially along a second frame member of the bicycle and terminating to a second open end. Additionally, the device includes a spring disposed within the hollow elongated spring housing and having a first end and a second end such that the first end is disposed adjacent the first open end of the hollow elongated spring housing and the second end is disposed adjacent and removably coupled the second open end of the hollow elongated spring housing. Furthermore, the deice includes a single length cable disposed within the first frame member of the bicycle and comprised of a second end removably coupled to the first end of the spring. Moreover, the single length cable is further comprised of an external cable portion externally extending from an opening disposed at a front portion of the first frame member and terminating to an opposite, first end of the cable such that the external cable portion has a length grater than a length of the spring such that the second end of the spring can be decoupled from the elongated spring housing and pulled through the second open end of the elongated spring housing a length greater than the spring length such that the first end of the spring can be decoupled from the second end of the cable for spring repair or replacement.

In another embodiment of the invention, a bicycle and retractable security cable device is provided which is comprised of a lower tube having a front portion and a rear portion, a pair of spaced apart chain stay tubes disposed at the rear portion of the lower tube, and a transition tube member connecting the lower tube and the pair of spaced apart chain stay tubes, a head connected to the front portion of the lower tube, and a handlebar operatively coupled to the head. The bicycle and retractable security cable device is further comprised and a hollow elongated spring housing rigidly coupled to the rear portion of the lower tube and comprised of a first open end circumscribing an opening disposed proximate the rear portion of the lower tube and an elongated portion extending away from the first open end and extending tangentially along at least one of the pair of spaced apart chain stay tubes and terminating to a second open end. The bicycle and retractable security device is further comprised of a spring disposed within the hollow elongated spring housing and having a first end and a second end such that the first end is disposed adjacent the first open end of the hollow elongated spring housing and the second end is disposed adjacent the second open end of the hollow elongated spring housing and is coupled thereto. The bicycle and retractable security device is further comprised of a single length cable disposed within the lower frame member of the bicycle and comprised of a second end coupled to the first end of the spring and an external cable portion externally extending from an opening disposed proximate the front portion of the lower tube and terminating to an opposite, looped end of the cable such that the cable is extendible from and returnable to a stowed position in the lower tube and the hollow elongated spring housing, and a coupling means having a first member secured to a lock and a second member secured to the handlebar of the bicycle for coupling and decoupling the looped end of the cable and the lock to the handlebar of the bicycle when the cable is in the stowed position by locking the lock onto the looped end of the cable and coupling the first member secured to the lock to the second member secured to the handlebar of the bicycle such that the cable loops up from the lower tube and couples to the handlebar of the bicycle for forming a cable loop complemental in shape to other bicycle cables coupled to the handlebar of the bicycle.

In another embodiment of the invention, a bicycle and retractable security cable device is provided which is comprised of a upper or top tube having a front portion and a rear portion, at least one seat stay member disposed at the rear portion of the upper tube, and a seat tube connecting the upper tube and the at least one seat stay member, a head connected to the front portion of the upper tube, and a handlebar operatively coupled to the head. The bicycle and retractable security cable device is further comprised of a hollow elongated spring housing rigidly coupled to the rear portion of the upper tube and comprised of a first open end circumscribing an opening disposed proximate the rear portion of the upper tube and an elongated portion extending away from the first open end and extending tangentially along at least the one seat stay tube and terminating to a second open end. The bicycle and retractable security cable device is further comprised of a spring disposed within the hollow elongated spring housing and having a first end and a second end such that the first end is disposed adjacent to the first open end of the hollow elongated spring housing and the second end is disposed adjacent and removably coupled to the second open end of the hollow elongated spring housing. The bicycle and retractable security cable device is further comprised of a single length cable disposed within the upper frame member of the bicycle and comprised of a second end coupled to the first end of the spring and an external cable portion externally extending from an opening disposed proximate the front portion of the upper tube and terminating to an opposite, loped end of the cable such that the cable is extendible from and returnable to a stowed position in the upper tube and the hollow elongated spring housing, and a coupling means having a first member secured to a lock and a second member secured to the handlebar of the bicycle for coupling and decoupling the lock and the looped end of the cable to the handlebar of the bicycle when the cable is in the stowed position by locking the lock onto the looped end of the cable and coupling the first member secured to the lock to the second member secured to the handlebar of the bicycle such that the cable loops up from the upper tube and couples to the handlebar of the bicycle for forming a security cable loop complemental in shape to other bicycle cables coupled to the handlebar of the bicycle.

Moreover, having thus summarized the invention, it should be apparent that numerous modifications and adaptations may be resorted to without departing from the scope and fair meaning of the present invention as set forth hereinbelow by the claims.

DETAILED DESCRIPTION OF THE INVENTION

Figure 1:
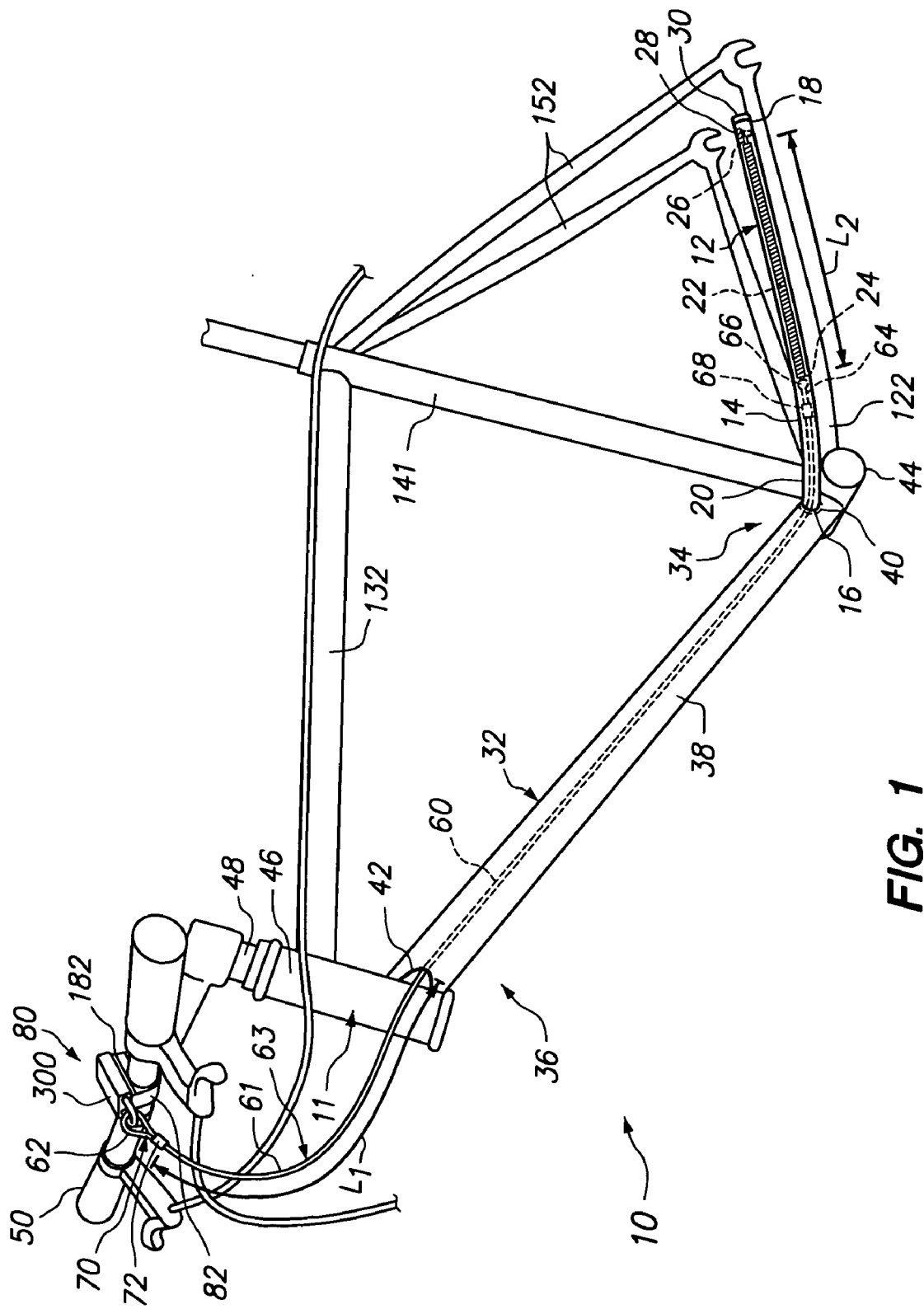
FIG. 1 is a side perspective view of a retractable security cable device shown disposed on a bicycle frame.

Considering the drawings, wherein like reference numerals denote like parts throughout the various drawing figures, reference numeral 10 is directed to a retractable security cable device or instrumentality particularly for use with bicycles.

In essence, and referring to the drawings, one embodiment of the invention provides a retractable security cable device 10 comprised of a hollow elongated spring housing 12 rigidly coupled to a rear portion 34 of a first frame member 32 (frame member 132 in FIG. 11) of a frame 11 such that the hollow elongated spring housing 12 includes a first open end 16 circumscribing an opening 40 disposed at the rear portion 34 of the first frame member 32 and further includes a portion 14 extending away from the first open end and tangentially along a second frame member 122 (frame member 152 in FIG. 11) of the frame 11 and terminating to a second open end 18. The retractable security cable device 10 is further comprised of a spring 22 disposed within the hollow elongated spring housing and having a first end 24 and a second end 26 such that the first end 24 is disposed adjacent the first open end 16 of the hollow elongated spring housing 12 and the second end 26 is disposed adjacent the second open end 18 of the hollow elongated spring housing 12 and is removably coupled thereto via, for example, a fastener 28 which may have a security head. The retractable security cable device 10 is further comprised of a single length cable 60 disposed within the first frame member 32 (frame member 132 in FIG. 11) of the bicycle and comprised of a first end 62 and a second end 64. The second end 64 of the cable 60 is removably coupled to the first end 24 of the spring 22 via, for example, eyelet 66. The single length cable 60 is further comprised of an external cable portion 61 externally extending from an opening 42 disposed at a front portion 36 of the first frame member 32 (frame member 132 in FIG. 11) and terminating to an opposite, first end 62 of the cable such that the external cable portion 61 has a length L1 grater than a length L2 of the spring 22 such that the second end 26 of the spring 22 can be decoupled from the elongated spring housing 12 and pulled through the second open end 18 of the elongated spring housing 12 a length greater than the spring length L2 such that the first end 24 of the spring 22 can be decoupled from the second end 64 of the cable 60 for spring repair or replacement.

The retractable security cable device 10 is further comprised of a lock and cable mounting device 80 having a first member 182 secured to a lock 300 and a second member 82 secured to a handlebar 50 of the bicycle 15 (FIG. 12) for coupling and decoupling the lock 300 to the handlebar 50 of the bicycle and for coupling and decoupling the first end 62 of the cable 60 to the handlebar 50 of the bicycle when the cable is in the stowed position by coupling the lock 300 onto the first end 62 of the cable as shown in FIG. 1 and coupling the first member 182 secured to the lock 300 to the second member 82 secured to the handlebar 50 of the bicycle such that the cable 60 loops up from first frame member 32 (frame member 132 in FIG. 11) and couples to the handlebar 50 of the bicycle for forming a security cable loop 63 complemental in shape to other bicycle cables coupled to the handlebar 50 of the bicycle.

Figure 2:
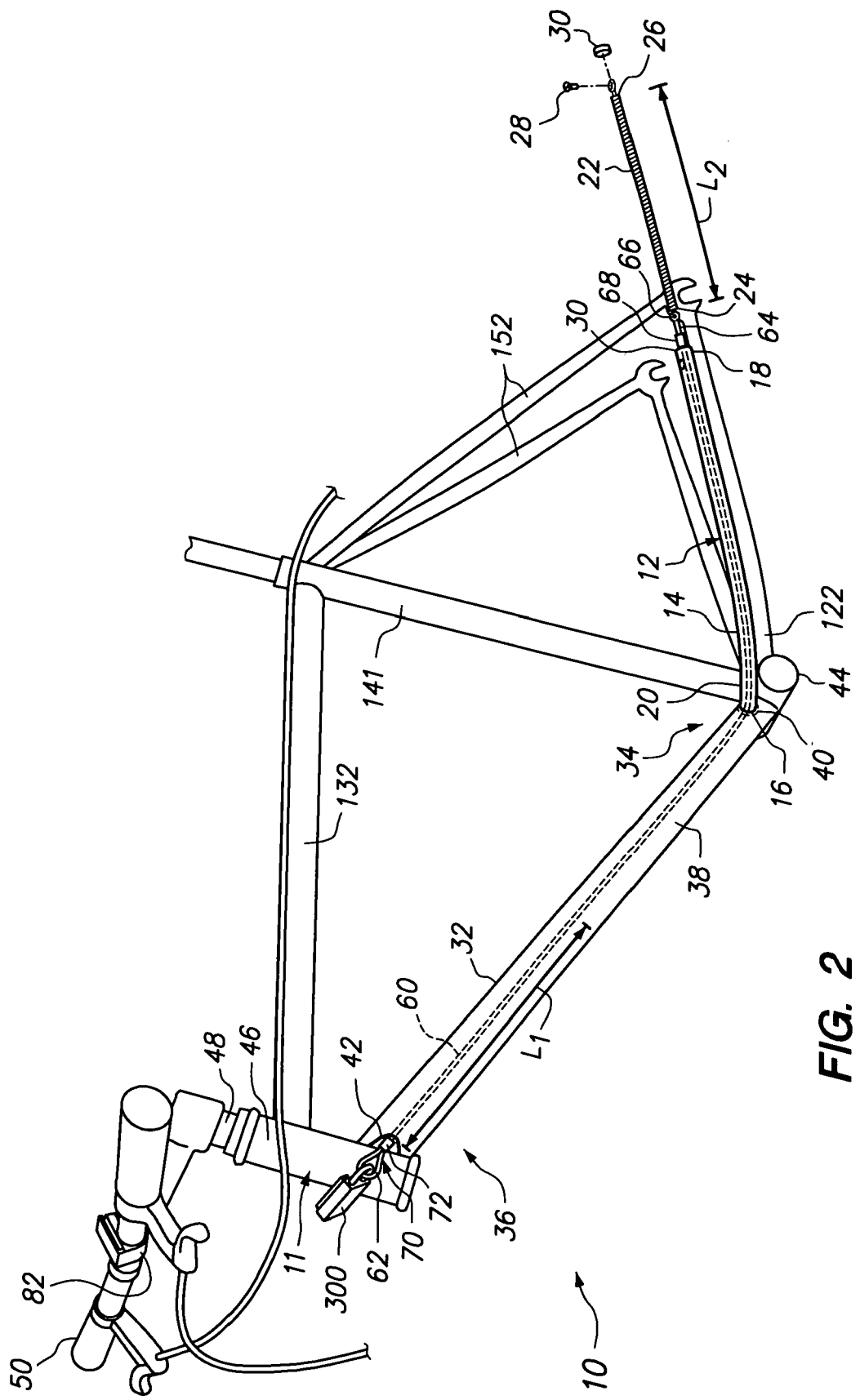
FIG. 2 is a partial exploded parts view of that which is shown in FIG. 1.
Figure 9:
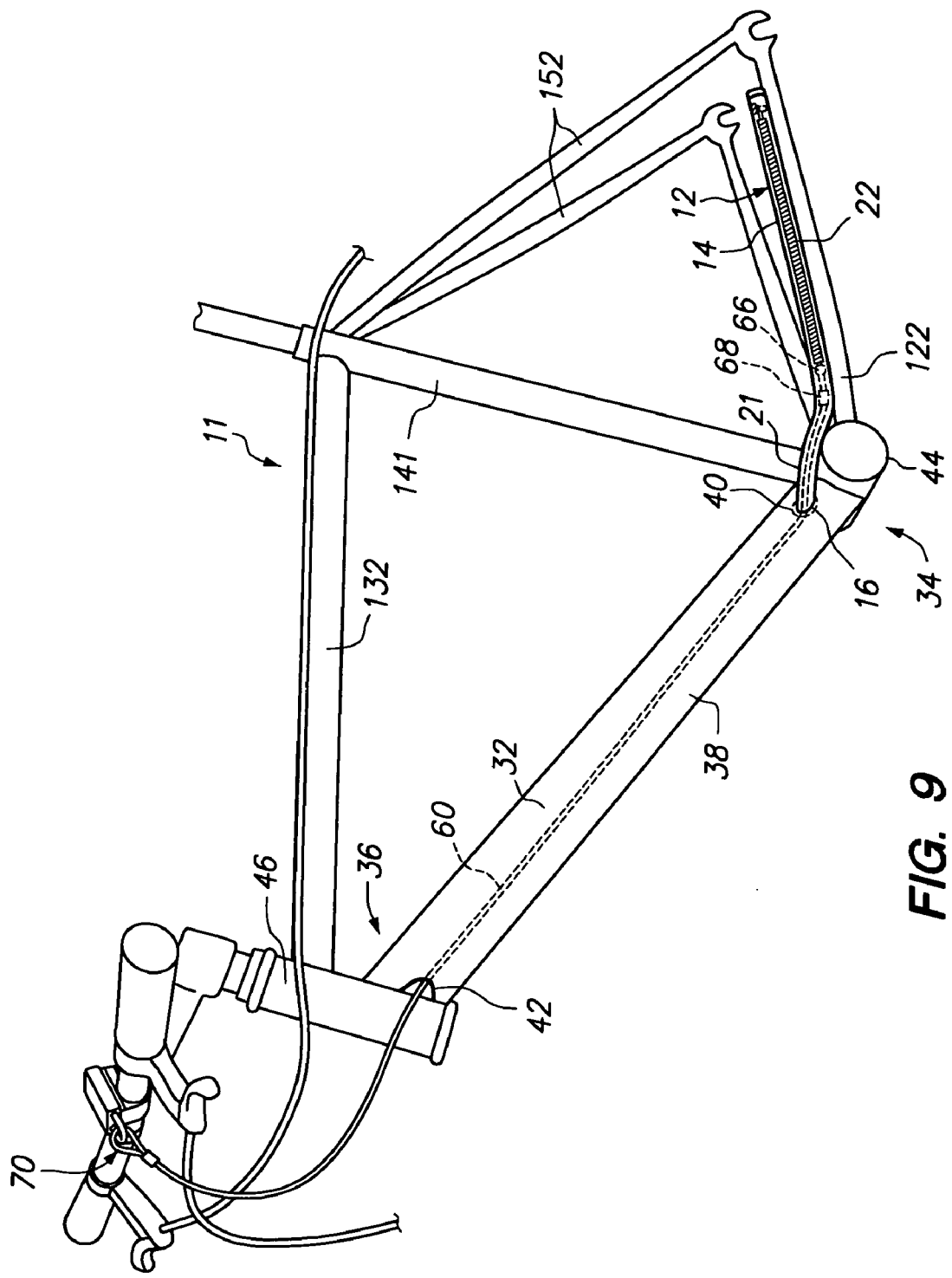
FIG. 9 is a side perspective view of the retractable security cable device having a hooked shaped spring housing and shown disposed on alternative embodiment of a bicycle frame.
Figure 10:
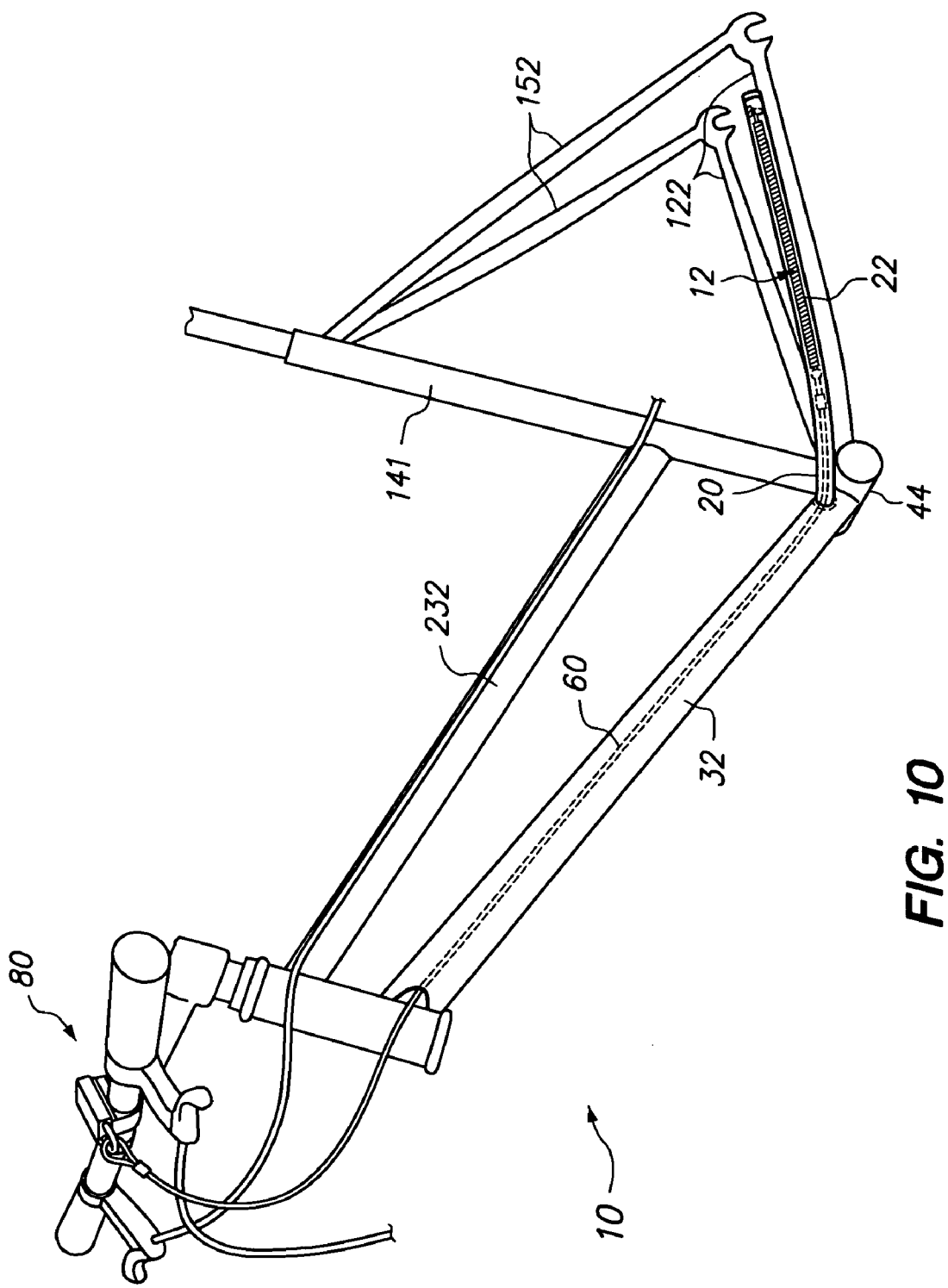
FIG. 10 is a side perspective view of the retractable security cable device shown disposed on another alternative embodiment of a bicycle frame typically referred as a women's frame.
Figure 11:
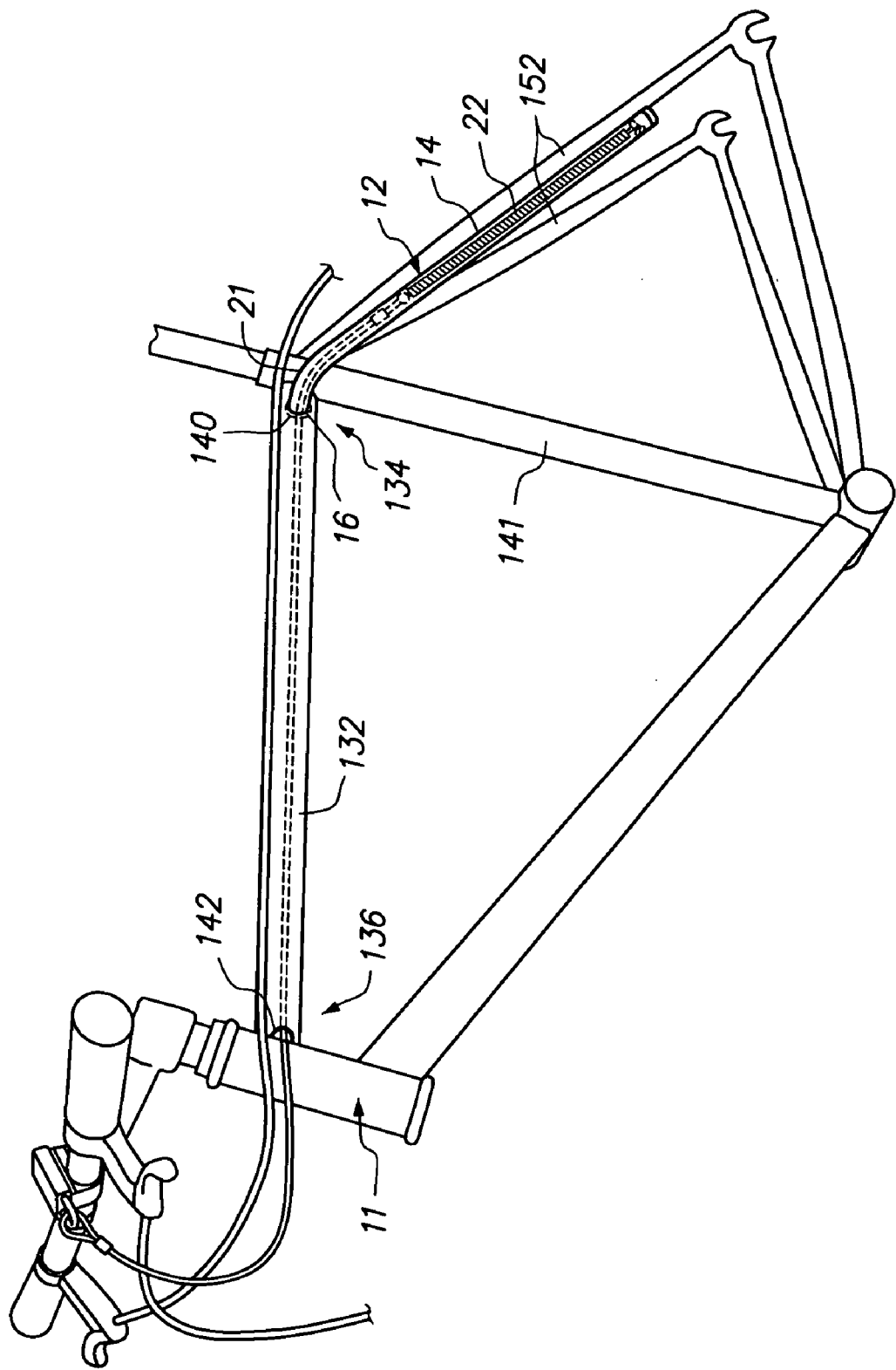
FIG. 11 is a side perspective view of the retractable security cable device shown disposed on an upper tube of a bicycle frame.
Figure 12:
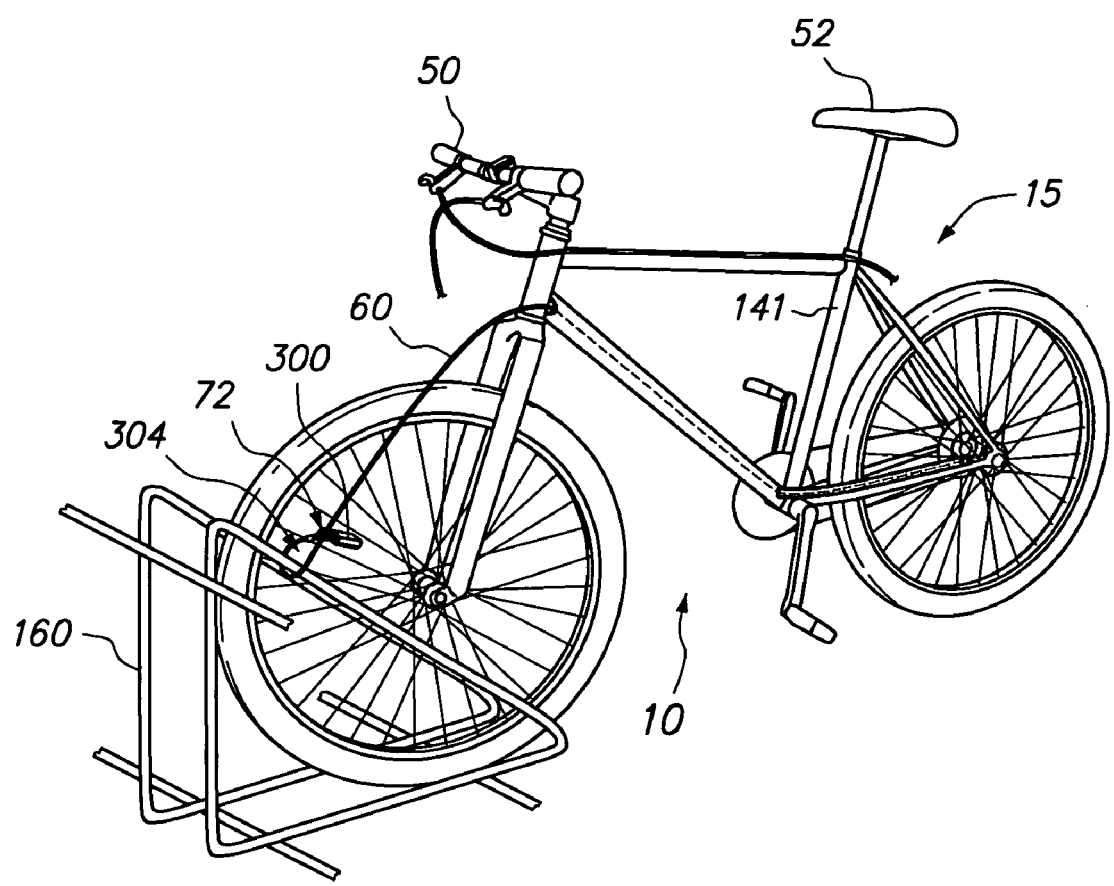
FIG. 12 is a side elevational view of a bicycle secured to a rack showing the retractable security cable device in an extended position during use and operation.

More specifically, FIGS. 1, 9, 10, and 11 illustrate various configurations of bicycle frame 11 and various configurations of the retractable security cable device or instrumentality 10 particularly used for securing bicycle 15 to a secured object or the like such as a bicycle rack 160 as shown in FIG. 12. Typically, each frame configuration is basically comprised of a lower tube 32 having a front portion and a rear portion, a pair of spaced apart chain stay tubes 122 disposed at the rear portion of the lower tube, and a transition tube 44 connected to the lower tube 32 and the pair of spaced apart chain stay tubes 122; a head 46 connected to the front portion of the lower tube 32; an upper or top tube 132 having a front portion 136 connected to the head 46 and a rear portion 134, a pair of spaced apart seat stay tubes 152 disposed at the rear portion of the upper tube 132 and each connected to one of the chain stay tubes 122 at their lower ends, and a seat tube 141 connected to the upper tube 132 and the pair of spaced apart seat stay tubes or members 152 at their upper ends and the seat tube 141 is further connected to the transition tube 44 at its lower end; a handlebar 50 is operatively coupled to the head 46, and a seat 52 is operatively coupled to the seat tube 141. FIGS. 1 and 2 show a typical men's frame, FIG. 9 show a typical men's frame having an oversized lower member or down tube 32 and transition tube 44, and FIG. 10 show a typical women's frame showing an upper member 232 which substantially runs parallel to the lower member 32.

Referring to FIGS. 1, 2, 9, and 10, one embodiment of the invention provides the retractable security cable device 10 comprised of the hollow elongated spring housing 12 rigidly coupled, such as by welding, to a rear portion 34 of the first or lower frame member 32 also known as a down tube 32 of frame 11 such that the hollow elongated spring housing 12 includes a first open end 16 circumscribing an opening 40 disposed at the rear portion 34 of the first frame member 32 and further includes a portion 14 extending away from the first open end and around the seat tube 141 and transition tube member 44, and extending tangentially along the second frame member or chain stay tube member 122 of the bicycle 11 and terminating to the second open end 18. The spring housing may include a concave 20 (FIGS. 1, 2, and 10) or convex 21 (FIGS. 9 and 11) transition portion adjacent its first open end 16 to accommodate for a transition between a first member 32, 132 and a second member 122, 152 and when necessary, a transition over or under a transition tube or bottom bracket tube 44. It is to be noted that the elongated spring housing 14 is sized to allow a second cable stop 68, to be explained below, and the second end 64 of the cable 60 to freely pass therethrough.

Referring to FIG. 11, another embodiment of the invention provides the retractable security cable device 10 comprised of the hollow elongated spring housing 12 rigidly coupled, such as by welding, to a rear portion 134 of the first or upper frame member 132 also known as a top tube 132 of frame 11 such that the hollow elongated spring housing 12 includes the first open end 16 circumscribing an opening 140 disposed at the rear portion 134 of the first frame member 132 and further includes the portion 14 extending away from the first open end and around the seat tube 141, and tangentially along a second frame member or seat stay tube member 152 of the frame 11 and terminating to second open end 18. The spring housing includes a convex 21 transition portion adjacent its first open end 16 to accommodate for a transition between the first member 132 and the second member 152.

Referring to FIGS. 1, 2, 9, 10 and 11, the retractable security cable device 10 is further comprised of a spring 22 preferably having a length shorter than a first cable length L1 to be further defined hereinbelow and freely received within and traversing through the hollow elongated spring housing 12. The spring 22 includes the first end 24 and the second end 26 such that the first end 24 is disposed adjacent the first open end 16 of the hollow elongated spring housing 12 and the second end 26 is disposed adjacent the second open end 18 of the hollow elongated spring housing 12 and is removably coupled thereto via, for example, fastener 28. Cap 30 preferably closes the second open end 18.

The retractable security cable device 10 is further comprised of a single length cable 60 preferably either coated or uncoated, flexible, durable, and substantially immune to breakage and cutting such as, an aviation cable or aircraft grade steel cable. The single length cable 60 is at least partially disposed within the first frame member 32 (frame member 132 in FIG. 11) of the bicycle and comprised of the first end 62 and a second end 64. The second end 64 of the cable 60 is removably coupled to the first end 24 of the spring 22 by, for example the eyelet connection 66 rigidly connected to the second end of the cable and operatively coupled to a hooked first end 24 of the spring 22. The single length cable 60 is further comprised of the external cable portion 61 (FIG. 1) externally extending from an opening 42 disposed at a front portion 36 of the first frame member 32 (opening 142 disposed at a front portion 136 of the frame member 132 in FIG. 11) and terminating to an opposite, first end 62 of the cable.

A first cable stop 72 and a second cable stop 68 are connected proximate the first and second ends 62, 64 of the cable 60, respectively. The first Cable stop 72 and openings 42, 142 are sized to preclude the first cable stop from passing into the first frame member 32, 132 respectively. The first cable stop may also double to provide a figure eight connection that acts as an anchor or a clamp to form a loop 70 (FIG. 1) proximate the first end 62 of the cable 60. In a retracted position, the length of the external cable portion 61 extending out the first frame members 32, 132 between openings 42, 142 and cable stop 72 defines a first length L1 grater than a length L2 of the spring 22 such that the second end 26 of the spring 22 can be decoupled from the elongated spring housing 12 and pulled through the second open end 18 of the elongated spring housing 12 a length greater than the spring length L2 such that the first end 24 of the spring 22 can be decoupled from the second end 64 of the cable 60 for spring repair or replacement. Please see FIGS. 1 and 2.

The second Cable stop 68 and openings 42, 142 are sized to preclude the second cable stop from passing out the first frame members 32, 132 respectively. The second cable stop may also double as a connection to the spring 22. Additionally, openings 40, 140 are sized to allow the second cable stop 68 and the second cable end 64 of the cable 60 to freely pass therethrough and are preferably formed integrally in first frame members 32, 132 proximate rear portions 34, 134 and distal to openings 42, 142 respectively. Likewise, openings 42, 142 are preferably formed integrally in the first frame members 32, 132 proximate front portions 36, 136 and distal to openings 40, 140 respectively. Openings 42, 142 are preferably reinforced around their edges to form a beveled-edge protective wall about the periphery of the openings or bores to provide a good frictional surface upon which the cable 60 slides easily, without damaging the paint or scratching the metal of the bicycle frame 11. Preferably, the opening is concave at a location where the cable 60 rides or rubes thereon.

Figure 3:
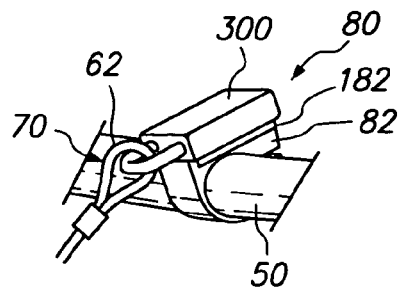
FIG. 3 is an elevational view of a lock and cable mounting device attached to a handlebar of the bicycle.

Referring to FIG. 3, one embodiment of the invention provides a lock and cable mounting device 80 attached to the bicycle and in one embodiment, attached to, for example, the handlebar 50 of the bicycle 15 as shown in FIG. 3. The lock and cable mounting device 80 is, in one embodiment, comprised of a tongue coupling member 82 and a groove coupling member 182.

Figure 4:
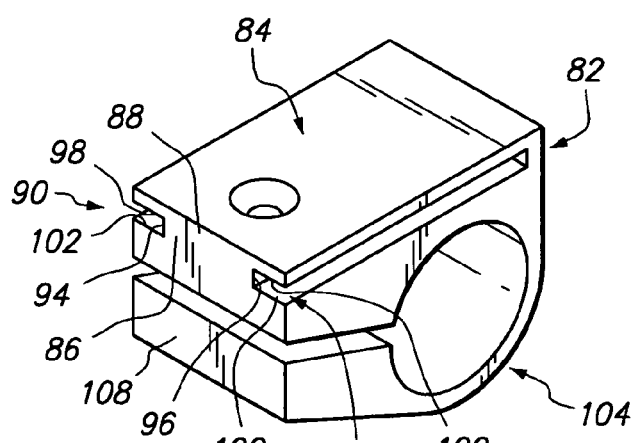
FIG. 4 is a front plan view of a tongue coupling member of the lock and cable mounting device.

Referring to FIG. 4, the tongue coupling member 82 of the lock and cable mounting device 80 is comprised of a T-shaped tongue member 84 disposed on a top 102 of a clamping means 104. The T-shaped tongue member 84 upwardly extends from a preferably substantially planar top 102 of the clamping means 104 and is comprised of base branch 86 substantially perpendicularly extending from the top of the clamping means at a median location and a top branch 88 substantially perpendicularly extending from base branch 86 and substantially parallel to the top 102 of the clamping means 104 such that a pair of channels 90 and 92 are defined on either side of the base branch 86 and have walls defined by the top 102 of the clamping means, the sides 94, 96 of the base branch 86 and bottoms 98, 100 of the top branch 88.

Figure 5:
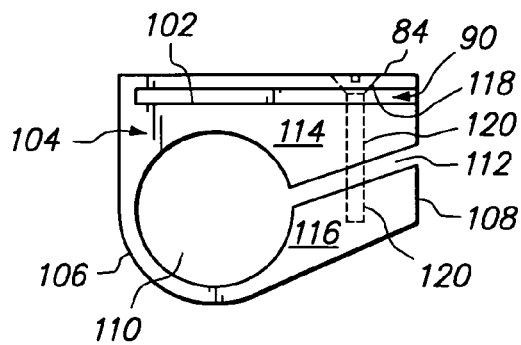
FIG. 5 is a side plan view of the tongue coupling member of the lock and cable mounting device.

Referring to FIG. 5, the clamping means 104 includes a generally rectangular body which downwardly depends from and is preferably integrally formed with the T-shaped tongue member 84 and includes top 108, a rounded front end 106, a back end 108, an opening 110 for the handlebar 50 to pass therethrough, a slot 112 passing through the back end 108 of the clamping means and through a sidewall of the opening 110 such that the slot 112 is defined by two side walls 114, 116 which may be compressed toward one another to lessen the size of the opening 110. Thus, the tongue coupling member 82 can be clamped onto handlebar 50 via a threaded fastener 118 passing through a threaded bore 120 disposed in the sidewalls 114, 116 for drawing the sides together for clamping the clamping means 104 and thus the T-shaped tongue member 84 to the handlebar 50 of the bicycle.

Figure 6:
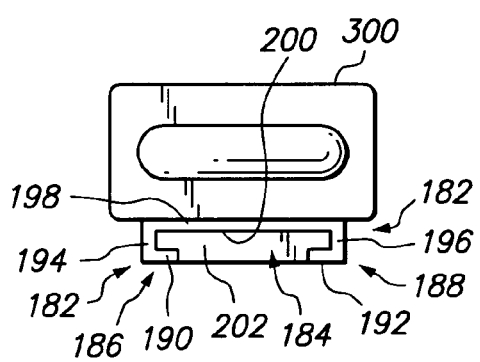
FIG. 6 is a front plan view of a grove coupling member of the lock and cable mounting device.
Figure 7:
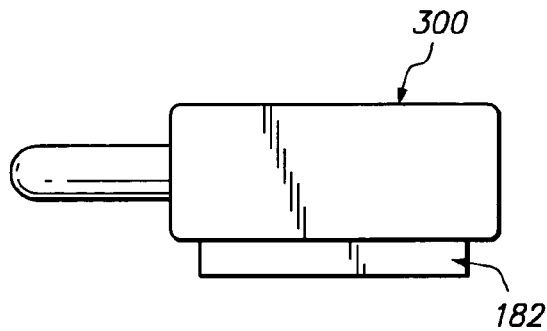
FIG. 7 is a side plan view of the grove coupling member of the lock and cable mounting device.
Figure 8:
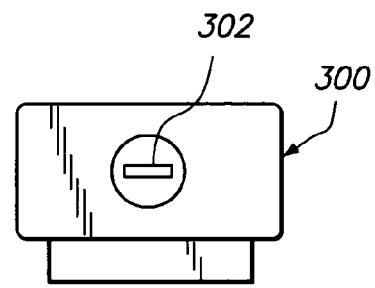
FIG. 8 is a back plan view of the grove coupling member of the lock and cable mounting device.

As noted above, and referring to FIGS. 6 through 8, the lock and cable mounting device 80 is also comprised of the groove coupling member 182 and lock 300 in addition to the tongue coupling member 82. The groove coupling member 182 is comprised of a substantially rectangular base member 198 having downwardly and inwardly L-shaped members 182, 188 depending from a bottom surface 200 thereof. The L-shaped members are comprised of spaced apart side members 194, 196 downwardly depending from the bottom surface 200 of the base member and terminating into spaced apart inwardly depending bottom members 190, 192 such that the area between the spaced apart side and bottom members forms a T-shaped groove 184 complemental to the T-shaped tongue member 84 and which is closed at one end by a back wall 202 such the T-shaped groove 184 slides onto and fits snugly over the T-shaped tongue member 84 by the inwardly depending bottom members 190, 192 sliding along respective channels 90, 92 and wherein the groove coupling member 182 is precluded from further travel by the abutment of the back wall 202 of the groove coupling member 182 abutting with a front face of tongue coupling member 82.

Referring to FIGS. 1 and 6 through 8, the lock is connected to a top of the substantially rectangular base member 198 of the groove coupling member 182 for coupling and decoupling the lock 300 and the looped end 72 of the cable 60 to, for example, the handlebar 50 of the bicycle when the cable 60 is in the stowed position (FIG. 1) by locking the lock onto the looped end 72 of the cable 60 and coupling the first member (groove coupling member 182) secured to the lock 300 to the second member (the tongue coupling member 82) secured to the handlebar 50 of the bicycle 15 such that the cable 60 loops up from the lower or upper tube 32, 132 and couples to the handlebar 50 of the bicycle 15 for forming a cable loop 63 complemental in shape to other bicycle cables coupled to the handlebar 50 of the bicycle 15.

In use and operation, and referring to the drawings and now to FIG. 1, the groove coupling member 182 and attached lock 300 are decoupled from the tongue coupling member 82 clamped onto the handlebar 50 of the bicycle 15 (FIG. 12). The lock is then unlocked via key means 302 and the cable is pulled from the stowed position with the spring compressed to an extended position with the spring stretched or positively biased and looped around an object or the like such as a bicycle rack 160 such that the lock 300 can be placed over the cable 60 and through the looped end 72 of the cable 60 and locked for providing a locked closed loop 304 around the object or the like such as a bicycle rack 160 as shown in FIG. 12.

Accordingly, in one aspect of the invention, a new, novel and useful retractable security device or instrumentality is provided.

In a further aspect of the invention, a device or instrumentality is provided as characterized above which includes a cable having a looped end and a second end, a first cable stop coupled to the looped end of the cable and a second cable stop coupled to the second end of the cable, wherein the cable is disposed in a bicycle frame member and passes through integrally formed first and second openings or outlets in opposite ends of the bicycle frame member such that the first cable stop prevents the looped end of the cable from entering the bicycle frame at the first outlet and the second cable stop prevents the second end of the cable from exiting the bicycle frame at the first outlet, and a spring attached to the second end of the cable and traversing the length of a spring housing, the spring housing tangentially disposed on a second frame member of the bicycle such that one end of the spring housing circumscribes the second outlet and is rigidly coupled thereto and tangentially extending along the second frame member and terminating in a second open end so that the spring can be removed and replaced as may be necessary.

In a further aspect of the invention, a device or instrumentality is provided as characterized above which includes a retractable cable having a looped end having a first cable stop and a second end having a second cable stop. An outlet is integrally formed in a frame member of a bicycle, at a location proximate a first end of the frame member and the looped end of the cable for allowing a first length of the cable to enter into the frame member when the second end is pulled and a second length of cable to exit out of the frame when the first end is pulled wherein said first stop limits the cable entry into the frame member at the first outlet and the second cable stop limits the second length of cable exiting from the frame member via the first outlet. A second outlet is also integrally formed in the frame member, however, at a location distal from the first outlet and proximate a second end of the frame member and sized to allow the second cable stop and the second end of the cable to freely pass therethrough. In addition, a hollow elongated spring housing having a first open end circumscribing the second outlet in the frame member and rigidly coupled to the frame member is provided. The hollow elongated spring housing has a portion that tangentially extends along a second frame member of the bicycle and terminates to a second open end. The hollow elongated spring housing is sized to allow the second cable stop and the second end of the cable to freely pass therethrough. The retractable security device of the instant invention also includes a spring having a length shorter than the first length of the cable. The spring is freely received within and traverses through the hollow elongated spring housing. The spring has a first end removably coupled to the second end of the cable and a second end removably coupled to the elongated spring housing at a location proximate the second open end such that the second length of cable can exit out of the frame when the first end is pulled thereby positively biasing the spring from a stowed position to a extended position having a spring force pulling back on the cable with a force opposite the pulling force and wherein when the spring force is greater than the pulling force the second length will retract back into the frame member and such that the second end of the spring can be decoupled from the elongated spring housing, and the spring can be pulled through the second open end of the elongated spring housing a maximum length equal to the first length of the cable such that the first end of the spring can be decoupled from the second end of the cable for spring replacement. In a further aspect of the invention, a device or instrumentality is provided as characterized above which includes a coupling means having a first member secured to a pad lock and a second member secured to a handle bar of a bicycle for coupling and decoupling said pad lock to the handle bar of the bicycle and for coupling and decoupling the looped end of the cable to the handle bar of the bicycle when the pad lock is locked onto the looped end of the cable.

In a further aspect of the invention, a device or instrumentality is provided as characterized above which is durable, relatively inexpensive to manufacture, reliable in operation, easily repairable, and reusable.

In a further aspect of the invention, a device or instrumentality is provided as characterized above which retains the integrity of a bicycle frame upon installation.

In a further aspect of the invention, a device or instrumentality is provided as characterized above which can be installed integrally with the bicycle during the regular bicycle manufacturing processes.

In a further aspect of the invention, a device or instrumentality is provided as characterized above which can be easily manufactured to fit all styles of both men's and women's bicycles.

In a further aspect of the invention, a device or instrumentality is provided as characterized above which when installed on the bicycle is aesthetically and cosmetically correct in that the cables of the device correspond to the existing break and/or gear cables of the bicycle.

In a further aspect of the invention, a device or instrumentality is provided as characterized above which prevents pinching and lash back of the cables where the cable enters an outlet in a bicycle frame while the device is in a stowed position, but while the bicycle is being ridden.

In a further aspect of the invention, a device or instrumentality is provided as characterized above which provides a good frictional surface on the outlets formed in the bicycle frame so that the through passage of the security cable does not damage the frame or the paint.

In a further aspect of the invention, a device or instrumentality is provided as characterized above which provides a cable having a first cable length, extending from a first cable outlet of a frame member and terminating to a first end, wherein the first cable length is greater than the length of a spring that is attached to a second end of the cable and housed within an open ended housing such that the spring can be pulled out of its housing a maximum length equal to the first cable length which allows easy removal of the spring.

These aspects, among other things, demonstrate industrial applicability of this invention.

Moreover, having thus described the present invention, it should be apparent that numerous modifications and adaptations may be resorted to without departing from the scope and fair meaning of the present invention as set forth hereinabove and as described hereinbelow by the claims.

I claim:

1. A security cable device for a bicycle, comprising in combination:

a hollow elongated spring housing rigidly coupled to a rear portion of a first frame member of a bicycle such that said hollow elongated spring housing includes a first open end circumscribing an opening disposed at the rear portion of the first frame member and further includes a portion extending away from said first open end and extending tangentially along a second frame member of the bicycle and terminating to a second open end;

a spring disposed within said hollow elongated spring housing and having a first end and a second end such that said first end is disposed adjacent said first open end of said hollow elongated spring housing and said second end is disposed adjacent to and is removably coupled from said second open end of said hollow elongated spring housing;

a single length cable disposed within the first frame member of the bicycle and comprised of a second end removably coupled to said first end of said spring; and said single length cable further comprised of an external cable portion externally extending from an opening disposed at a front portion of the first frame member and terminating to an opposite, first end of the cable such that said cable is extendible out of and retractable into said first frame member by pulling on and releasing tension on said external cable portion causing an extension and retraction of said spring for defining an extended and stowed position of the cable such that said external cable portion has a length grater than a length of the spring such that said second end of said spring can be decoupled from said elongated spring housing and pulled through the second open end of said elongated spring housing a length greater than the spring length such that said first end of said spring can be decoupled from said second end of said cable for spring repair or replacement.

2. The device of claim 1 wherein said first end of said single length cable includes a loop defining a looped end of said single length cable.

3. The device of claim 2 further including a coupling means having a first member secured to a lock and a second member secured to the handlebar of the bicycle for coupling and decoupling said lock and said looped end of said single length cable to the handlebar of the bicycle when said single length cable is in the stowed position by locking the lock onto said looped end of said single length cable and coupling said first member, secured to said lock, to said second member secured to the handlebar of the bicycle such that said cable loops up from the lower tube and couples to the handlebar of the bicycle for forming a cable loop complemental in shape to other bicycle cables coupled to the handlebar of the bicycle.

4. A bicycle and a security cable device, comprising in combination:

a lower tube having a front portion and a rear portion, a pair of spaced apart chain stay tubes disposed at the rear portion of the lower tube, and a transition tube member connecting the lower tube and the pair of spaced apart chain stay tubes;

a head connected to the front portion of the lower tube;

a handlebar operatively coupled to the head; and a hollow elongated spring housing rigidly coupled to the rear portion of the lower tube and comprised of a first open end circumscribing an opening disposed proximate the rear portion of the lower tube and an elongated portion extending away from said first open end and extending tangentially along one of the pair of spaced apart chain stay tubes and terminating to a second open end;

a spring disposed within said hollow elongated spring housing and having a first end and a second end such that said first end is disposed adjacent said first open end of said hollow elongated spring housing and said second end is disposed adjacent to and removably coupled from said second open end of said hollow elongated spring housing;

a single length cable disposed within the lower frame member of the bicycle and comprised of a second end coupled to said first end of said spring and an external cable portion externally extending from an opening disposed proximate the front portion of the lower tube and terminating to an opposite, looped end of the cable such that said cable is extendible from and returnable to a stowed position in the lower tube and said hollow elongated spring housing by an extension and retraction of said spring; and a coupling means having a first member secured to a lock and a second member secured to the handlebar of the bicycle for coupling and decoupling said lock and said looped end of said cable to the handlebar of the bicycle when said cable is in the stowed position by locking the lock onto said looped end of said cable and coupling said first member secured to said lock to said second member secured to the handlebar of the bicycle such that said cable loops up from the lower tube and couples to the handlebar of the bicycle for forming a cable loop complemental in shape to other bicycle cables coupled to the handlebar of the bicycle.

5. The bicycle and a security cable device of claim 4 wherein said external cable portion has a length greater than a length of the spring when said cable is in the stowed position such that said second end of said spring can be decoupled from said elongated spring housing and pulled through the second open end of said elongated spring housing a length greater than the spring length such that said first end of said spring can be decoupled from said second end of said cable for spring repair or replacement.

6. A bicycle and a security cable device, comprising in combination:

an upper tube having a front portion and a rear portion, a pair of spaced apart chain stay tubes disposed at the rear portion of the upper tube, and a transition tube member connecting the upper tube and the pair of spaced apart chain stay tubes;

a head connected to the front portion of the upper tube;

a handlebar operatively coupled to the head; and a hollow elongated spring housing rigidly coupled to the rear portion of the upper tube and comprised of a first open end circumscribing an opening disposed proximate the rear portion of the upper tube and an elongated portion extending away from said first open end and extending tangentially along one of the pair of spaced apart chain stay tubes and terminating to a second open end;

a spring disposed within said hollow elongated spring housing and having a first end and a second end such that said first end is disposed adjacent said first open end of said hollow elongated spring housing and said second end is disposed adjacent to and removably coupled from said second open end of said hollow elongated spring housing;

a single length cable disposed within the upper frame member of the bicycle and comprised of a second end coupled to said first end of said spring and an external cable portion externally extending from an opening disposed proximate the front portion of the upper tube and terminating to an opposite, looped end of the cable such that said cable is extendible from and returnable to a stowed position in the upper tube and said hollow elongated spring housing by an extension and retraction of said spring; and a coupling means having a first member secured to a lock and a second member secured to the handlebar of the bicycle for coupling and decoupling said lock and said looped end of said cable to the handlebar of the bicycle when said cable is in the stowed position by locking the lock onto said looped end of said cable and coupling said first member secured to said lock to said second member secured to the handlebar of the bicycle such that said cable loops up from the upper tube and couples to the handlebar of the bicycle for forming a cable loop complemental in shape to other bicycle cables coupled to the handlebar of the bicycle.

7. The bicycle and a security cable device of claim 6 wherein said external cable portion has a length grater than a length of the spring when said cable is in the stowed position such that said second end of said spring can be decoupled from said elongated spring housing and pulled through the second open end of said elongated spring housing a length greater than the spring length such that said first end of said spring can be decoupled from said second end of said cable for spring repair or replacement.

* * * * *